US008149857B2

(12) United States Patent
Kaplan et al.

(10) Patent No.: US 8,149,857 B2
(45) Date of Patent: Apr. 3, 2012

(54) REMOTE HDSL TEST ACCESS SYSTEM

(75) Inventors: Murray L. Kaplan, Cherry Hill, NJ (US); Kenneth N. Kaplan, Voorhees, NJ (US); Paul R. Lorey, Jr., Gibbsboro, NJ (US)

(73) Assignee: Telecom Assistance Group, West Berlin, NJ (US)

( * ) Notice: Subject to any disclaimer, the term of this patent is extended or adjusted under 35 U.S.C. 154(b) by 890 days.

(21) Appl. No.: 11/298,999

(22) Filed: Dec. 9, 2005

(65) Prior Publication Data
US 2007/0133754 A1    Jun. 14, 2007

(51) Int. Cl.
*H04L 12/28* (2006.01)
*G06F 15/173* (2006.01)
*G06F 1/16* (2006.01)
*H02B 1/01* (2006.01)
*H02B 1/20* (2006.01)

(52) U.S. Cl. .................. 370/419; 709/223; 361/679.31; 361/825; 361/826

(58) Field of Classification Search .................. 370/419; 709/223, 231; 361/826–828
See application file for complete search history.

(56) References Cited

U.S. PATENT DOCUMENTS

| | | | | |
|---|---|---|---|---|
| 6,192,361 | B1 * | 2/2001 | Huang | 707/9 |
| 6,202,160 | B1 * | 3/2001 | Sheikh et al. | 713/310 |
| 6,625,020 | B1 * | 9/2003 | Hanson et al. | 361/695 |
| 6,686,541 | B2 * | 2/2004 | Chan | 174/72 A |
| 2002/0004913 | A1 * | 1/2002 | Fung | 713/300 |
| 2002/0032762 | A1 * | 3/2002 | Price et al. | 709/223 |
| 2004/0079711 | A1 * | 4/2004 | Hartman et al. | 211/26 |
| 2004/0093516 | A1 * | 5/2004 | Hornbeek et al. | 713/201 |
| 2005/0057912 | A1 * | 3/2005 | Hardt et al. | 361/826 |
| 2005/0229154 | A1 * | 10/2005 | Hiew et al. | 717/110 |
| 2008/0247723 | A1 * | 10/2008 | Herzog et al. | 385/135 |

* cited by examiner

*Primary Examiner* — Kevin C Harper
*Assistant Examiner* — Thinh Tran
(74) *Attorney, Agent, or Firm* — Panitch Schwarze Belisario & Nadel LLP

(57) ABSTRACT

A system and method are provided for modifying an existing HDSL system to allow for remote access to performance monitoring information stored on each HDSL circuit card. This is accomplished by attaching a cable harness to an existing chassis. A cable harness containing a number of data lines equal to the number of circuit cards in the chassis is housed in a moveable bar which protects the harness and allows removal or insertion of HDSL circuit cards. Each data line attaches to a data port on the individual circuit cards, and the cable harness terminates to a multiplexer (shelf multiplexing unit). A system controller unit provides power and signaling to the shelf multiplexing unit, instructing the multiplexing unit to select an individual data line connected to an individual circuit card. Then utilizing a mutually agreed upon communications means, the system controller unit extends the HDSL data port connection to a remote location. This distributed multiplexing arrangement provides economical remote access to all circuit cards in a central office from a remote location. Utilizing specialized user software, a user can access any circuit card connected to the data lines of the cable harness. The user software provides a terminal emulation so a user can have a virtual connection to the circuit card interface from a remote location. The user can then navigate through various menus provided by the circuit card interface as if the user were directly connected to the circuit card.

13 Claims, 7 Drawing Sheets

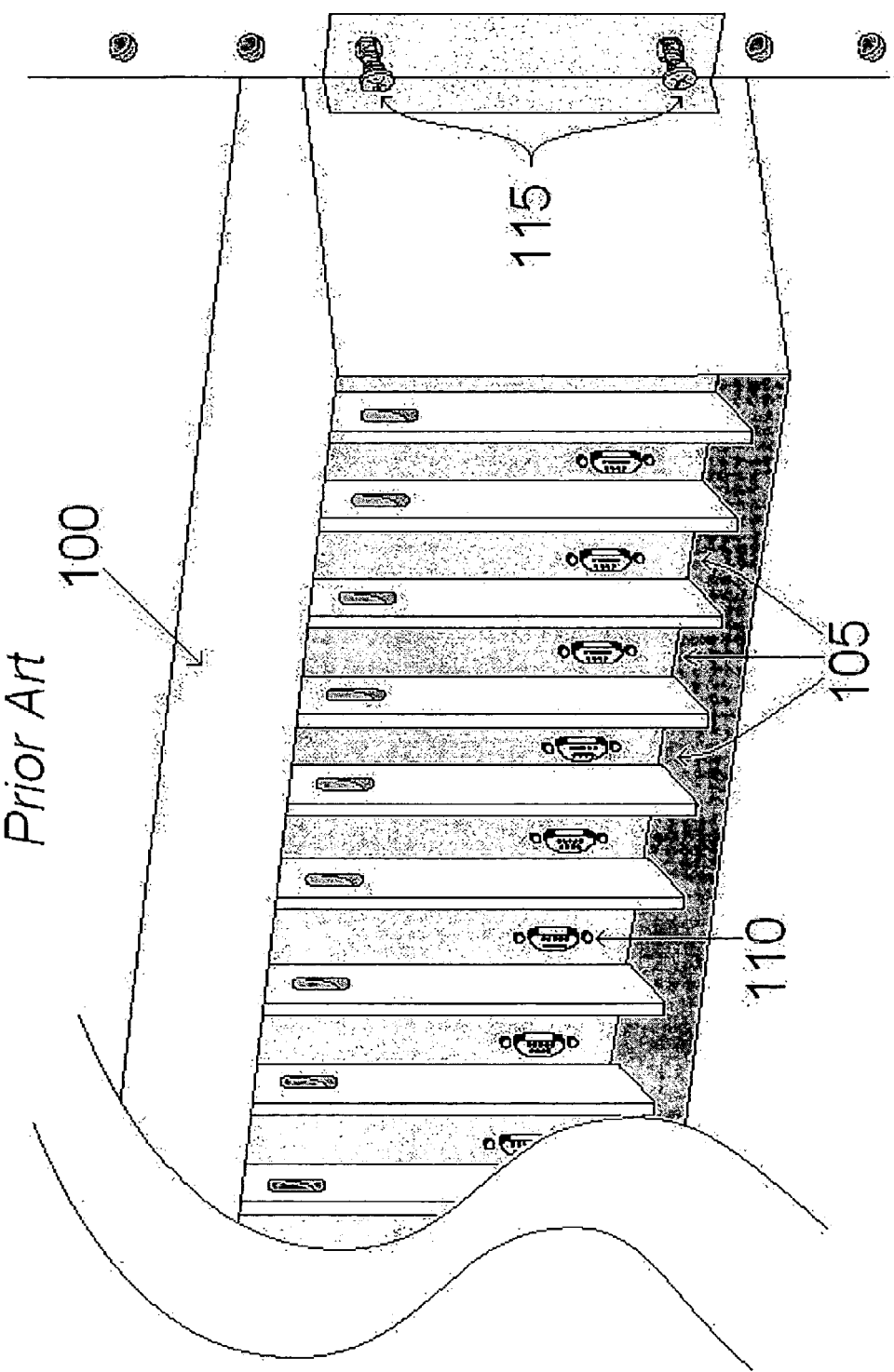

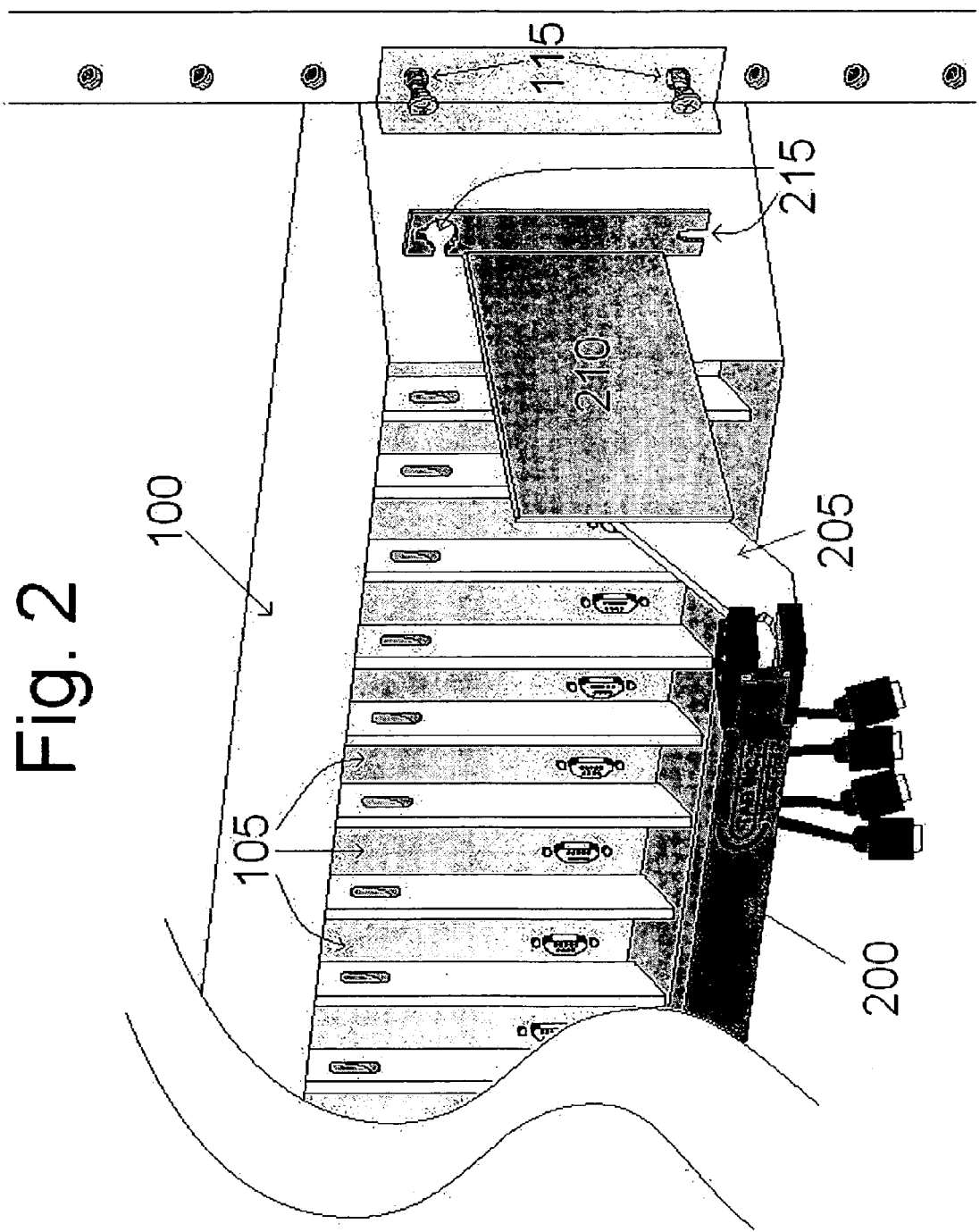

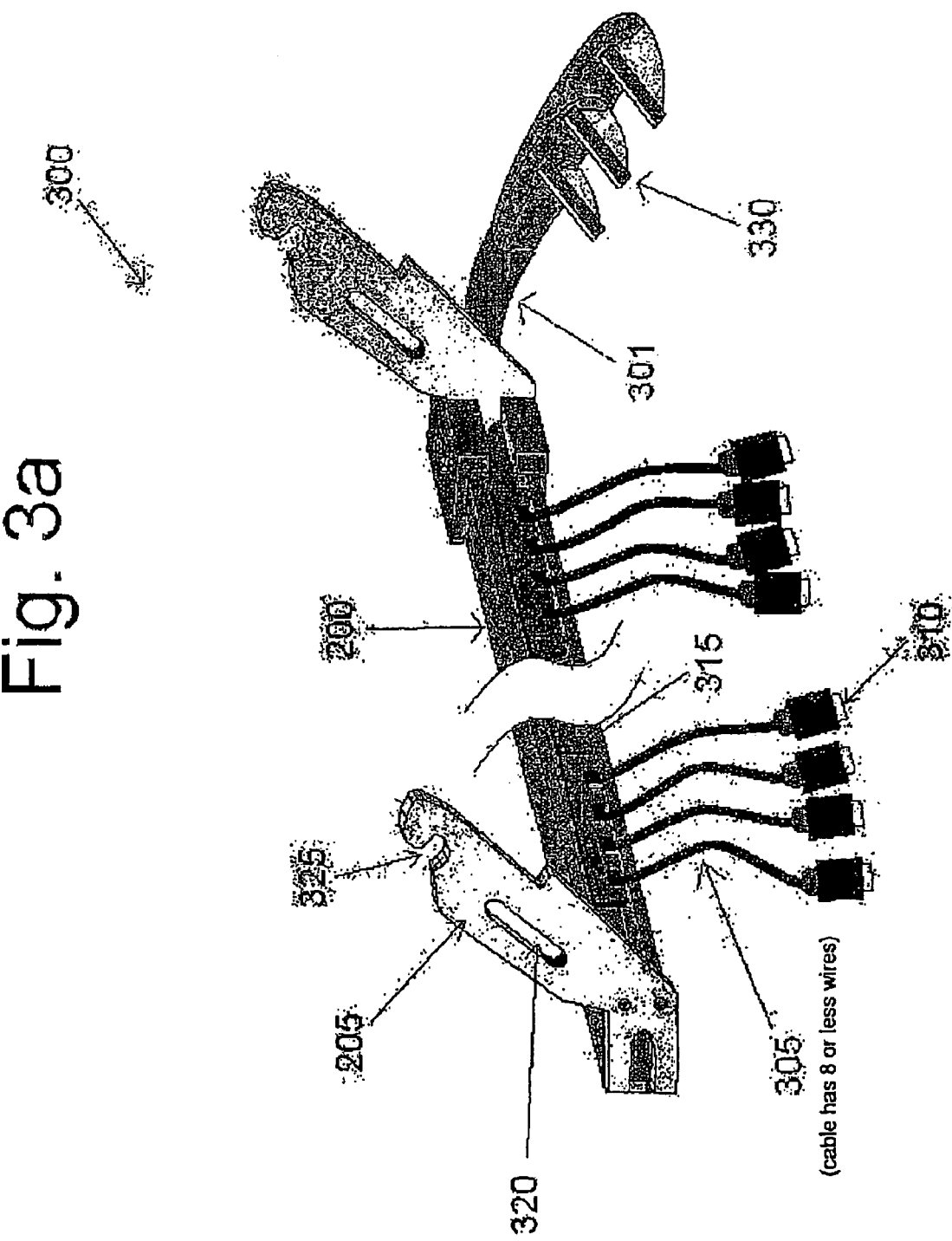

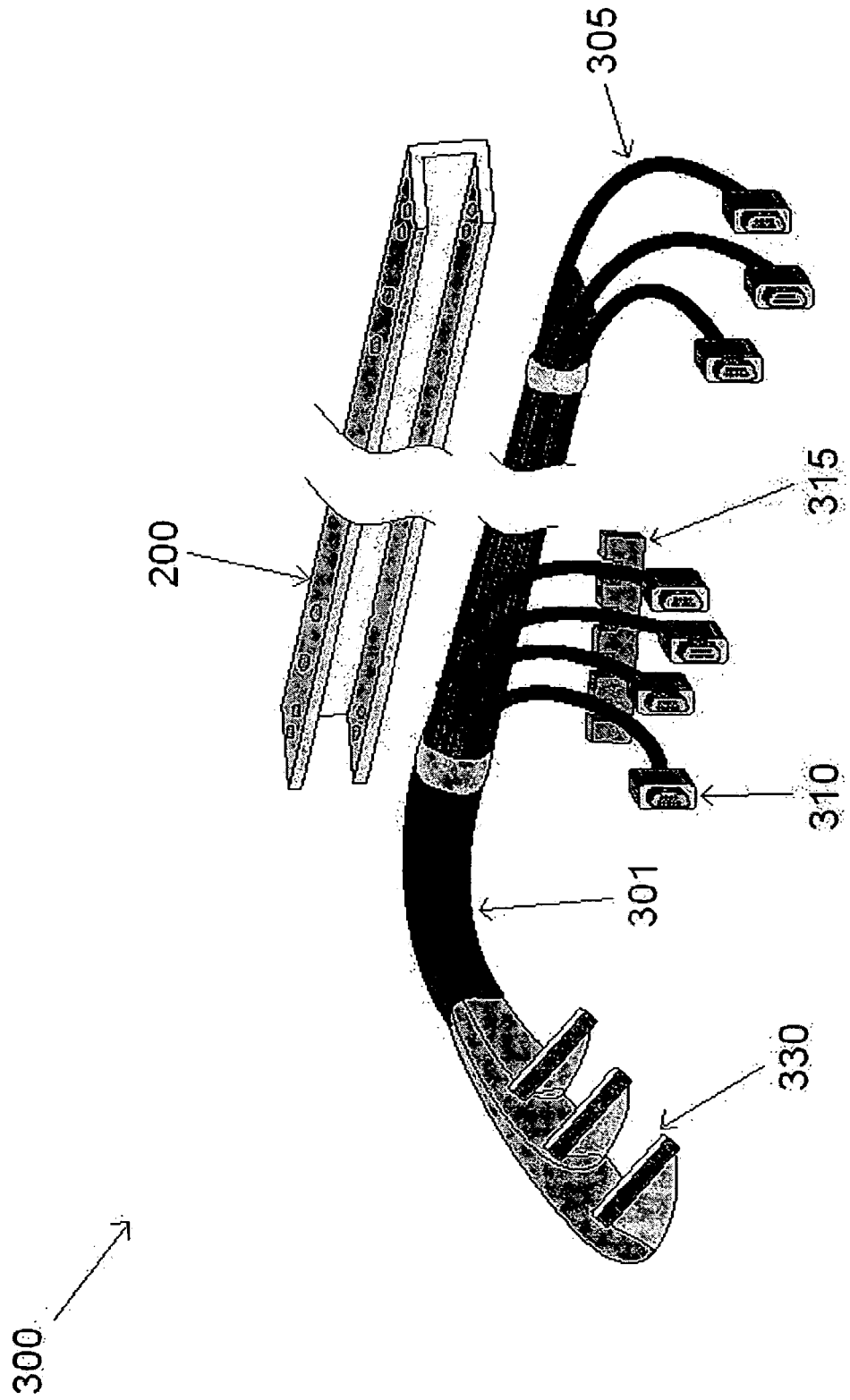

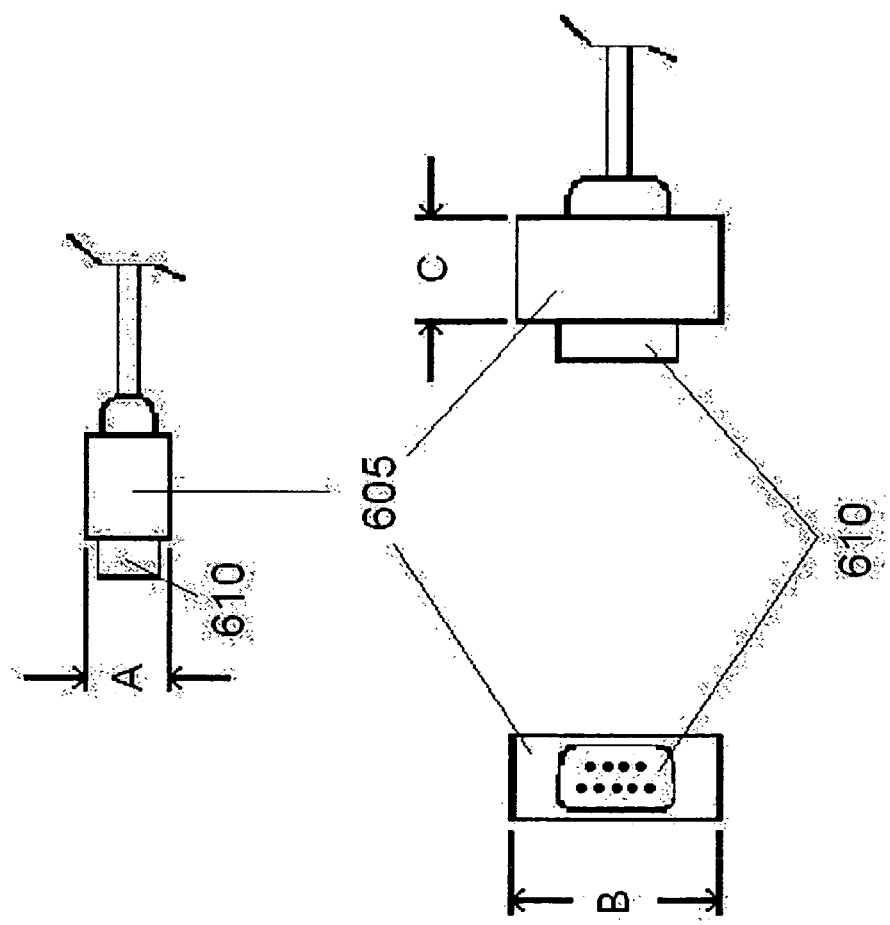

REMOTE HDSL TEST ACCESS SYSTEM

BACKGROUND OF THE INVENTION

1. Field of the Invention

The present invention relates to a system and method for remote access to High bit-rate Digital Subscriber Line (HDSL) circuitry configuration and performance data and, more specifically, to a system and method of adding equipment to existing HDSL circuit chassis to allow economical remote access to HDSL circuit cards' craft access ports.

2. Description of the Related Art

Historically the telephone industry has used various digital encoding techniques to multiplex multiple subscriber circuits onto one or two wire pairs. Widely utilized DS-1 (T-1) encoding provides twenty-four subscriber lines on two unconditioned copper twisted pair wires. T-1 has operational limitations though, especially when spanning long distances between the telephone supplier and the end user. T-1 is limited to approximately eight hundred feet of distance between source and destination before a repeater must be used. A limit of ten repeaters can be used on one span, which limits the total distance between the source of the T-1 line and the ultimate destination to under nine thousand feet. Both the limited range of use and the extra expense of repeaters have prompted the telephone industry to look to other methods of encoding.

High bit-rate Digital Subscriber Line (HDSL) transceivers encode DS-1 into a multi-bit stream that can be sent on one or two twisted pairs up to twelve thousand feet without a repeater. Most DS-1 circuits today are delivered using HDSL. The HDSL circuit cards have built in diagnostic and configuration capabilities, allowing units to be soft-configured for various modes of operation. The units also measure and record data relating to their performance, such as error rates and signaling margin, collectively called Performance Monitoring (PM) data. Configuration and PM data are accessed by a skilled technician using an ACSII terminal connected through a standard (9-pin) RS-232 serial port located on the face plate of the HDSL circuit card. Data collected in this manner is non-intrusive, i.e. it does not disrupt a working circuit.

Up to twenty-eight HDSL circuit cards are housed in a twenty-three inch chassis. Typical telephone offices have 4-50 (or more) of these chassis, providing HDSL service to over fourteen hundred customers. To access the configuration and recorded performance data on these circuit cards, a technician is required to physically connect an ASCII terminal to the circuit card. This is a costly operation in terms of man-hours required to access and collect PM data. Additional costs can arise from a loss of revenue due to delays in diagnosing a defective DS-1 circuit since a technician is not immediately available on location to physically connect a terminal to the defective circuit card.

The first HDSL systems deployed in the telephone industry did not allow for remote test access capabilities. As mentioned above, the only means to provision, test or retrieve historical data from the HDSL circuit card was via a serial port on the faceplate of each circuit card. Newer HDSL systems incorporate remote access features, but these are vendor specific and require replacement of an entire shelf as well as the individual HDSL circuit cards. With over 10 million legacy HDSL circuit cards still in use, replacing each individual circuit card is financially impractical. What is needed is a way of modifying existing HDSL systems to provide remote access to some or all craft access ports on an individual HDSL circuit card in an HDSL chassis.

SUMMARY OF THE INVENTION

The present invention provides telephone company personnel with an economical means of remotely accessing HDSL circuit Performance Monitoring (PM) data and configuration menus from existing circuit cards, without interrupting service, while also allowing easy replacement of a faulty circuit card. This is accomplished by attaching a cable harness to an existing chassis. A cable harness containing a number of data lines equal to the number of circuit cards in the chassis is housed in a moveable bar which protects the harness. Each data line in the harness terminates to a connector that connects to a data port on an individual circuit card. The harness bar has keyhole slots for attaching to the chassis' existing screws. This allows the harness bar to be installed while causing no interruption of service to the HDSL customers. The harness bar can lock into a resting position out of the way of another row of circuit cards, and can be moved to a position that allows removal and insertion of circuit cards. Each of the connectors is attachable to a data port on an individual circuit cards, and the cable harness terminates to a multiplexer (shelf multiplexing unit). A system controller unit provides power and signaling to the shelf multiplexing unit, instructing the multiplexing unit to select an individual data line connected to a circuit card a user wishes to remotely access. Then utilizing a dial-up modem, local network, internet, or any other mutually agreed upon communications means, the system controller unit extends the HDSL data port connection to a remote location. This distributed multiplexing arrangement provides economical remote access to all circuit cards in a central office from a remote location. Utilizing specialized user software, a user can access any circuit card connected to the data lines of the cable harness. The user software provides a terminal emulation so a user can have a virtual connection to the circuit card interface from a remote location. The user can then navigate through various menus provided by the circuit card interface as if the user were directly connected to the circuit card.

In a preferred embodiment, the present invention is used to remotely access HDSL circuit cards. The cable harness has a number of data lines equal to at least the number of HDSL circuit cards in an HDSL chassis, and each data line terminates in a specialized narrow 9-pin connector. The movable harness bar is mounted to the existing screws on the HDSL chassis, and can be locked into a position such that it does not obstruct other equipment. The harness bar can be temporarily unlocked and moved into a position that allows access to the circuit cards in the chassis to which it is attached for testing or removal of HDSL circuit cards. A system controller provides power and signaling to a shelf multiplexing unit, via a single plug in cable, to establish a communications link with a particular HDSL circuit card, then using the agreed upon communications means the system controller extends the HDSL connection to a remote location. Using user software, a technician at a remote location is provided a terminal emulation screen which represents a virtual connection to the HDSL circuit card interface.

BRIEF DESCRIPTION OF THE DRAWINGS

FIG. 1 illustrates an existing HDSL chassis.

FIG. 2 illustrates an existing HDSL chassis fitted with the present invention.

FIG. 3a illustrates a harness bar assembly including the cable harness, data lines, connectors and protective metal channel.

FIG. 3b illustrates an exploded view of the harness bar assembly with the cable harness removed from the metal channel.

FIG. 6 shows a detailed view of a connector.

DETAILED DESCRIPTION OF THE PREFERRED EMBODIMENTS

Figure 4A:
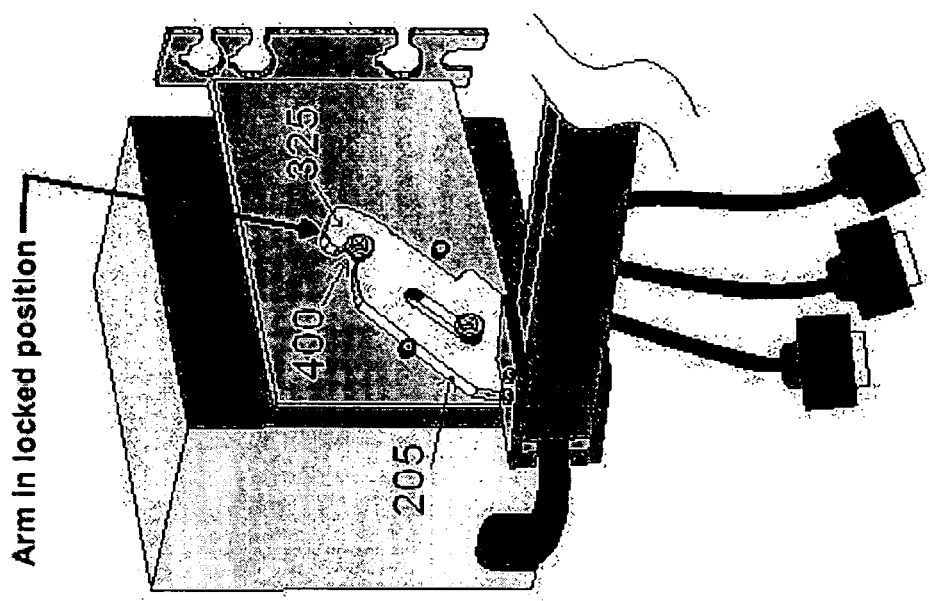
FIGS. 4a and 4b illustrate a locking arm mechanism attached to the harness bar assembly in both locked and unlocked positions.

FIG. 1 illustrates an existing HDSL chassis. Shelf 100 contains a row of circuit cards 105 mounted in the HDSL chassis. Each circuit card 105 has a serial port 110 which can be used by a technician to connect an ASCII terminal to the circuit card 105 to access Performance Monitoring (PM) data. In order to access the data on a second circuit card, the technician must disconnect the terminal from a serial port 110 on the first circuit card, and reconnect the terminal to the serial port on the second circuit card. This process continues for each of the cards in each row of the HDSL chassis. Each row of circuit cards is mounted to the chassis frame with mounting screws 115.

FIG. 2 illustrates the same existing HDSL chassis from FIG. 1; however the chassis in FIG. 2 is fitted with the present invention. In the preferred embodiment, harness bar 200 is a C-shaped metal bar connected at each end to locking arm 205. Locking arm 205 is connected to mounting bracket 210. The arm is connected such that the harness bar 200 can swing down to allow access to the individual HDSL circuit cards 105, but can also lock into an up position out of the way of another row of HDSL circuit cards. Mounting bracket 210 has a set of keyhole slots 215 which fit over the existing mounting screws 115 to securely lock the harness bar 200, locking arm 210, and mounting bracket 215 to the HDSL chassis.

FIG. 3a illustrates harness bar assembly 300. Cable harness 301 is protectively enclosed by the harness bar 200. On one end, cable harness 301 terminates into a number of data lines 305. The exact number of data lines 305 present is determined by the number of HDSL circuit cards in each row of the HDSL chassis. Each data line 305 terminates in a modified serial 9-Pin connector 310. Each 9-pin connector 310 is modified to connect to an individual serial port 110 on each HDSL circuit card 105. In this example, the connectors are modified to be made narrower than a standard connector to allow adjacent cards to be connected simultaneously as can be seen in FIG. 6 described in more detail below. Additionally in this example, while a 9-pin connector is used as connection means to connect to the serial port 110, it is well known and understood in the art that individual connection points in a 9-pin connector are not limited to just nine pins, i.e., less than nine of the pins can be used. The connector itself may also be less than or greater than a 9-pin connector. Comb spacer 315 is used to insure appropriate spacing between each data line 305 to allow to direct attachment of the 9-pin connector 310 to the serial port 110. The opposite end of the cable harness terminates all data lines into a suitable connector(s) 330 for attaching to a shelf multiplexing unit. Additionally in FIG. 3a, the locking arm 205 is shown. Here, two additional components of the locking arm can be seen. First is the pivoting slot 320. This slot allows the locking arm to slide up or down a small screw to reposition the harness bar assembly 300. The second component is the locking hook 325. Locking hook 325 is used to lock the harness bar assembly 300 into an up and resting position. When the technician wishes to physically access a row of HDSL circuit cards, the harness bar assembly 300 can be lowered by first unhooking the locking hook 325, then sliding the harness bar assembly down. The pivoting slot 320 only allows the harness bar to move enough that a technician can replace an individual HDSL circuit card. When the technician is finished, the harness bar assembly 300 is raised back up and the locking arm 205 is locked back into position by hooking the locking hook 325 around an upper screw. Detailed views of the locking arm are shown in FIGS. 4a and 4b.

FIG. 3b illustrates the harness bar assembly 300 where the cable harness 301 has been removed from the harness bar 200. This figure shows the individual data lines 305 that make up the cable harness 301, as well as the comb spacer 315 that holds the data lines at evenly spaced intervals to allow 9-pin connector 310 to line up correctly with an HDSL circuit card.

Figure 4B:
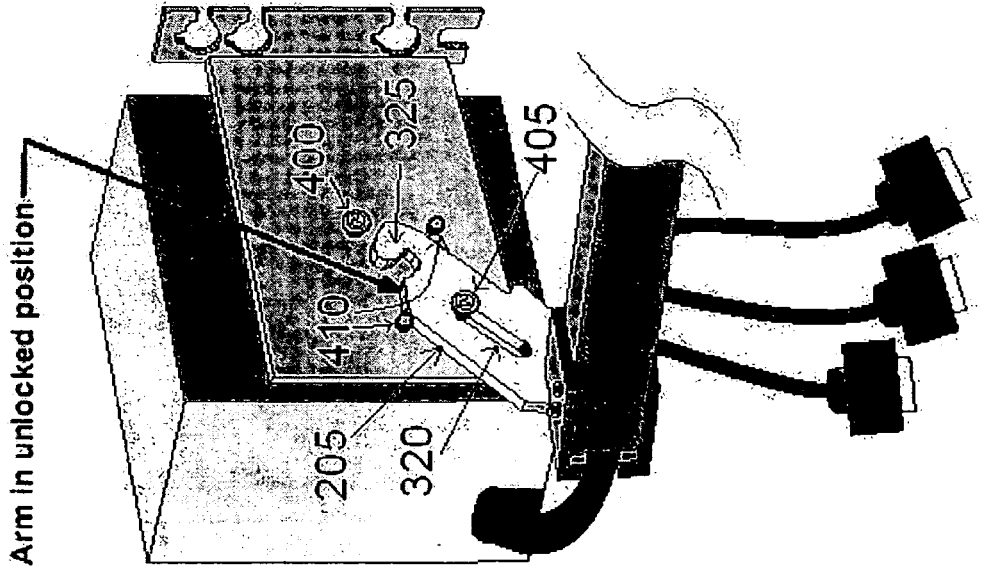

FIGS. 4a and 4b illustrate the locking arm 205 in both an unlocked and locked position. In FIG. 4a, the unlocked position, the locking hook 325 is unfastened from locking screw 400. The locking arm 205 slides down on pivot screw 405 until the pivot slot 320 causes the motion to stop. Guide posts 410 direct the motion of the harness bar assembly as it is being lowered, and assures proper replacement of the assembly when the assembly is re-raised. Conversely, FIG. 4b shows the harness bar in the locked position. Locking hook 325 is firmly fastened to locking screw 400. Once the harness bar assembly is locked securely in place, a technician can access another row of HDSL circuit cards.

Figure 5:
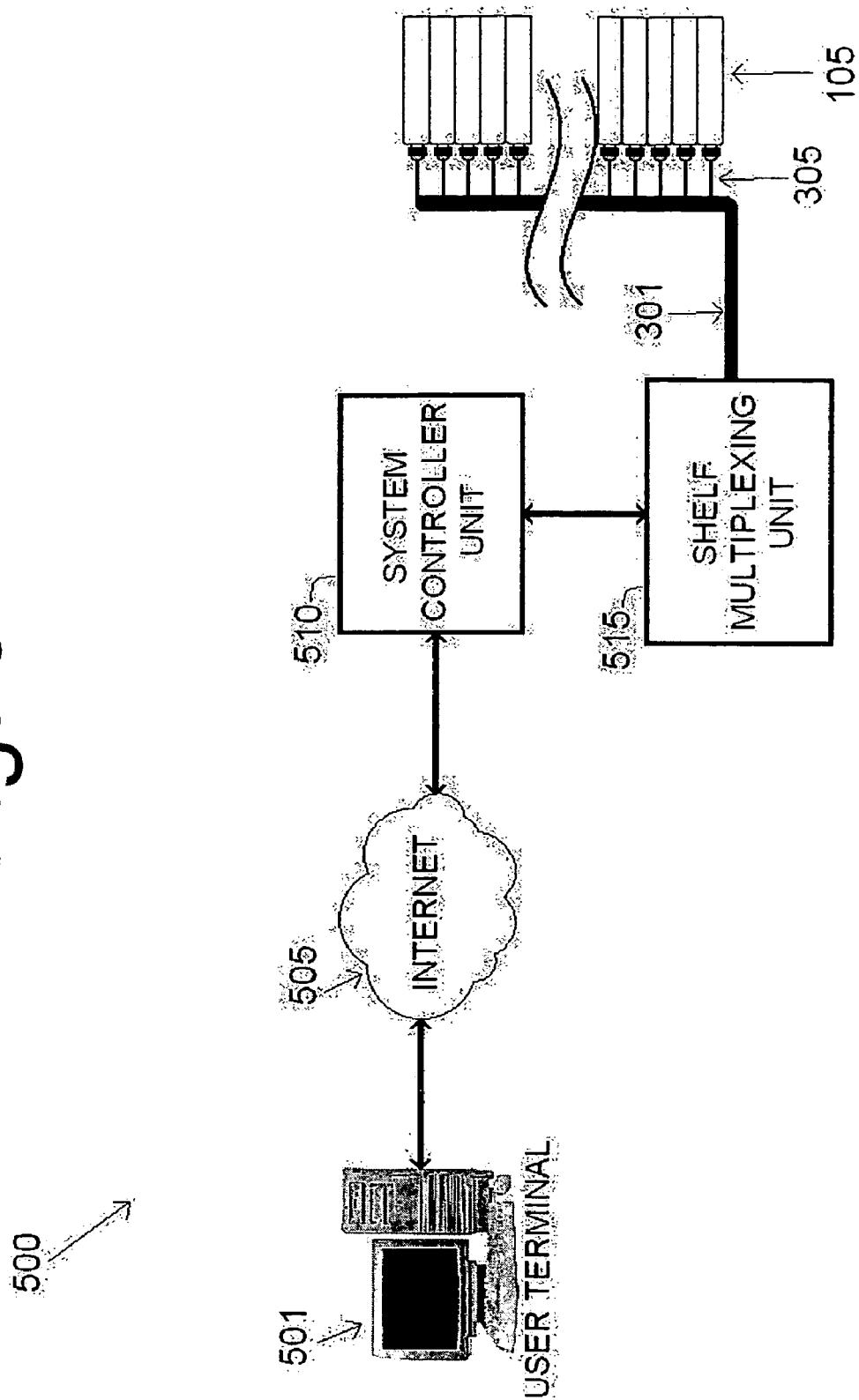
FIG. 5 illustrates a block diagram of one embodiment of the present invention.

FIG. 5 illustrates the complete system 500 used by a technician to access the PM information stored in each individual HDSL circuit card. The individual circuit cards 105 are connected to individual data lines 305. The data lines are assembled into cable harness 301 which is operably connected to a multiplexing means. The multiplexing means may be a multiplexer integrated as a shelf multiplexing unit; a multiplexer integrated into the harness assembly bar; multiplexer functionality distributed among the connectors to the individual HDSL circuit cards; or done remotely using an agreed upon communications medium, such as the Internet, a local network, or even a wireless network. Other means for providing the multiplexing functionality will be apparent to a practitioner of ordinary skill in the art and are considered part of this disclosure. In this example, the multiplexing means is a shelf multiplexing unit (SMU) 515. SMU 515 is used to selectively connect to one of the data lines in the cable harness, thereby establishing an active line connection to an individual HDSL circuit card and enabling transmitting and receiving data between the SMU and the HDSL circuit cards. SMU 515 is then operably connected to the system controller unit (SCU) 510. SCU 510 acts as both a power supply and a command signal generator. SCU 510 powers SMU 515 by accepting power from a central office where the system is being used, and converting the native power into an acceptable voltage for use by SMU 515. This low power circuitry and low power signaling used by SCU 510 allows for the use of standard 4-pair network (or cat-5) cabling and standard RJ-45 connectors to facilitate easy installation. A technician (or anyone wishing to access the HSDL circuit cards) at user terminal 501 can connect to SCU 510 via the Internet 505, or any other agreed upon communications means. SCU 510 provides multiple simultaneous connections, allowing multiple HDSL circuits to be accessed at once. An economical configuration provides four channels, which is more than sufficient to support typical HDSL service requirements. Very few HDSL circuits require attention at any one time and typical connection duration is only three minutes.

To connect to SCU 510, user software must be installed at user terminal 501. This software runs on a processor installed at the user terminal. The user directs SCU 510 to select one of 64 SMUs and signal the selected SMU 515 to select the correct line of the cable harness, establishing a connection to the desired HDSL circuit. Selection is achieved by "geography" so as to minimize database maintenance. The software guides a user through the selection of an HDSL circuit card. First, the user is prompted to select a central office. The central office can contain thousands of HDSL circuit cards, so additional input is needed from the user. Next, the user is prompted for the aisle/floor of the central office where an HDSL relay rack is located which contains the desired HDSL circuit card. Third, the user is prompted to select the appropriate relay rack. Next the user selects the individual shelf of the chassis containing the desired HDSL circuit card, and finally the user selects the HDSL circuit card. Once the user has selected the appropriate geographic information, the software establishes a connection with SCU 510 (e.g., via TCP/IP). The software sends a command to direct SCU 510 to connect to the desired card. SCU 510 signals the appropriate SMU 515 with the needed information for establishing a connection to the desired HDSL card, and the connection is made. Once a connection is made, the user software provides a terminal emulation (typically VT-100) so the user can have a virtual connection to the HDSL craft-interface. Through this emulated terminal, the user can navigate through the menus provided by the various HDSL circuit cards as if the user were connected to the individual HDSL circuit card locally. Selected data can be viewed at the user terminal, stored in a file or sent for printing. The user can also access the configuration parameters for the HDSL circuit cards. This allows a service provider to economically reconfigure or repair an HDSL circuit from a remote location.

FIG. 6 shows a detailed view of a modified 9-pin connector as used in a preferred embodiment of the present invention. Dimensions A, B, and C reflect maximum dimensions of connector housing 605 that can be used in the preferred embodiment and still allow adjacent cards to be connected simultaneously. Dimension A is set at 0.500 inches. This dimension allows enough room for pin assembly 610 to remain unaltered, yet still allow multiple adjacent connectors to be simultaneously attached. Similarly, dimension B is 1.250 inches to allow adequate room for pin assembly 610 to remain unaltered. Dimension C is 0.625 inches. Utilizing these three dimensions, a modified 9-pin connector for use in the preferred embodiment is established. The dimensions and configuration described herein are given for purpose of example; other embodiments of the present invention may require different sized connectors, and this example is not intended to limit the connector to only the size used in the preferred embodiment.

While a preferred embodiment of the invention has been described, this embodiment has been presented by way of example only, and is not intended to limit the scope of the present invention. Accordingly, the breadth and scope of the present invention should be defined only in accordance with the following claims and their equivalents.

What is claimed is:
1. A system for modifying an existing HDSL chassis comprising:
   a cable harness comprising:
      a plurality of data lines;
      connectors connecting said plurality of data lines to craft access ports of an existing HDSL chassis such that each craft access port has a dedicated data line; and
   a harness bar assembly comprising:
      a protective channel for housing said cable harness,
      at least one locking arm extending from the protective channel, the locking arm including an oblong slot that allows movement of the harness bar assembly relative to the existing HDSL chassis, and
      a multiplexer formed unitarily with the harness bar assembly,
      wherein said harness bar assembly locks into a resting position so as not to obstruct access to equipment adjacent to said HDSL chassis, and
      wherein said harness bar assembly can be unlocked and moved to a retracted position sliding along the oblong slot so as to be temporarily displaced, thereby allowing removal or installation of one of said HDSL circuit cards without disturbing any other of said data line connections.

2. The system of claim 1, wherein said cable harness is operably connected to a remote monitoring module, and wherein the multiplexer is operably connected between said cable harness and said remote monitoring module, said multiplexer comprising:
   selection means for selecting one of said data lines as an active line thereby establishing a connection between said remote monitoring module and a selected HDSL circuit card and enabling transmitting and receiving data between said remote monitoring module and said HDSL circuit card.

3. The system of claim 2, further comprising:
   a system controller operably connected between said remote monitoring module and said multiplexer, said system controller comprising:
      a receiver operably configured to said remote monitoring module, configured to receive an access request from a remote user at said remote monitoring module, said access request containing the address of an individual HDSL circuit card to be monitored;
      power converter means coupled to said multiplexer, supplying power to system controller and said multiplexer; and
      controller data lines coupled to said multiplexer, providing an electrical signal interface between said system controller and said multiplexer; said system controller configured to encode signals sent to said multiplexer to select a specific HDSL circuit card connection based upon said access request, verify that said specific HDSL circuit card has been selected, and control a data channel used by said remote user to access performance monitoring data stored on said specific HDSL circuit card.

4. The system of claim 3, wherein said remote monitoring module comprises:
   a remote computer terminal for use by said remote user;
   a communications interface connecting said remote computer terminal to said system controller, wherein said communications interface includes at least one of Internet port connections, modem connections, or RS-232 connections.

5. The system of claim 4, wherein said remote monitoring module further comprises:
   a processor configured to:
      provide communication protocols for communicating with said system controller;

provide a user interface for selecting and connecting to said system controller;

provide navigation menus enabling selection of a specific HDSL circuit card by said remote user thereby establishing a connection between said remote monitoring module and said specific HDSL circuit card;

provide a terminal emulation representing a virtual connection to said specific HDSL circuit card's craft-interface; and capture terminal screens or selected data for saving to a file or printing to a printer.

6. The system of claim 3, wherein said controller data lines comprise cabling requiring eight or less wires.

7. The system of claim 6, wherein said multiplexer is a shelf multiplexing unit attached to said existing HDSL chassis.

8. The system of claim 6, wherein said multiplexer is integrated into said harness bar assembly.

9. The system of claim 6, wherein said multiplexer is distributed amongst said connector.

10. A harness bar assembly for a HDSL chassis comprising:

a substantially C-shaped harness bar;

at least one locking arm extending from the substantially C-shaped harness bar, the locking arm including:

an oblong slot, and a locking member at an end of the locking arm; and a mounting bracket operatively connected to the locking arm; the mounting bracket including:

a pivot member for engaging the oblong slot, and a guide post for guiding the motion of the substantially C-shaped harness bar about the oblong slot, wherein the substantially C-shaped harness bar is configured to move between an up position and a down position relative to the mounting bracket as the oblong slot slidingly engages the pivot member.

11. The harness bar assembly of claim 10, wherein the locking member is a locking hook integrally formed with the locking arm.

12. The harness bar assembly of claim 10, wherein the mounting bracket further comprises a locking element for locking with the locking hook.

13. The harness bar assembly of claim 10, further comprising a plurality of data lines, each data line having at least one of a male connector and a female connector.

* * * * *